United States Patent
Teichner et al.

(10) Patent No.: US 7,646,435 B2
(45) Date of Patent: Jan. 12, 2010

(54) MOBILE TELEVISION RECEIVER

(75) Inventors: Detlef Teichner, Königsfeld (DE); Hermann Link, Donaueschingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 707 days.

(21) Appl. No.: 11/272,218

(22) Filed: Nov. 10, 2005

(65) Prior Publication Data
US 2006/0195870 A1 Aug. 31, 2006

(30) Foreign Application Priority Data
Nov. 11, 2004 (EP) .................................. 04026829

(51) Int. Cl.
*H04N 5/00* (2006.01)
*H04N 7/10* (2006.01)

(52) U.S. Cl. .................. 348/616; 348/473; 375/240.27; 725/36; 725/75

(58) Field of Classification Search ................. 348/616, 348/473; 375/240.27, 240.26, 240.12, 240.24; 386/46, 124, 125, 105; 725/32–36, 74–77
See application file for complete search history.

(56) References Cited

U.S. PATENT DOCUMENTS 4,345,272 A * 8/1982 Shirota ....................... 348/617
6,337,947 B1 * 1/2002 Porter et al. .................. 386/55
7,023,926 B2 * 4/2006 Matsuura et al. ....... 375/240.27
2003/0003899 A1 1/2003 Tashiro et al. ............... 455/414
2007/0130581 A1 * 6/2007 Del Sesto et al. ............. 725/36

FOREIGN PATENT DOCUMENTS

| EP | 1 246 417 A2 | 10/2002 |
| EP | 1 505 836 A1 | 2/2005 |

* cited by examiner

*Primary Examiner*—M. Lee (57) ABSTRACT

The invention relates to the reproduction of a television signal on a distant reproduction device. The received television signal is encoded and transmitted in a digital data format over a communication link to the reproduction device. The reproduction device decodes the received video information for display on a display screen. The invention is particularly intended for use in mobile vehicles, coaches and trains, where the signal strength of a received television signal during travel is continuously varying and signal distortions occur frequently. In order to reduce the effect of signal distortions on the perceived image and audio quality, the invention inserts a compressed pre-stored video or audio data into the data stream transmitted from the television receiver to the reproduction device upon detection of a television signal distortion. Thus, the decoding procedure at the display device can be maintained in spite of a received television signal of insufficient signal strength.

30 Claims, 6 Drawing Sheets

MOBILE TELEVISION RECEIVER

PRIORITY CLAIM

This application claims the benefit of priority from European Patent Application No. 04026829.4, filed Nov. 11, 2004, which is incorporated herein by reference in its entirety.

BACKGROUND OF THE INVENTION

1. Technical Field

The present invention relates to systems and methods for reproducing a television signal on a reproduction device, and in particular, to a mobile television receiver providing a television signal for reproduction to a reproduction device.

2. Related Art

Automotive vehicles are increasingly being equipped with on-board television receivers. The television receivers may receive television programs broadcast terrestrially by one or more radio stations. The radio stations may be distributed such that, at each vehicle location within an area covered by a broadcast program, the vehicle can receive the program by at least one of the radio stations. Television receivers used in vehicles may select a particular channel for receiving radio waves of a nearby radio station, wherein the channel selection depends on the driver's program selection and the vehicle position in relation to the closest radio stations. Presently-used radio chains are operated such that each radio station transmits the television signal on an individual channel, i.e., an individual radio frequency. During travel, the received television signal at the mobile television receiver may fade, necessitating the television receiver to continuously select a radio station providing a better signal quality, i.e., having a higher signal strength.

The terrestrially broadcast television signals are typically transmitted in an analog manner based on long established television standards. Examples of analog television standards include PAL, SECAM and NTSC. The PAL (Phase Alternate Lines) standard is typically used in western Europe and Asia. The SECAM (Sequentiel Couleur Avec Memoire) standard was developed based on PAL and is in use, for instance, in France, Eastern Europe and Northern Africa. PAL and SECAM use the same resolution of 625 lines at a frame rate of 25 frames per second. The NTSC (National Television Standards Committee) standard is used in Northern America and Japan. NTSC has a lower line resolution compared to PAL and SECAM (525 lines) and displays the frames at a frame rate of 30 frames per second.

The television signal received by a television receiver may first be decoded to a composite video signal (CVS). Typically, the composite video signal is converted to YUV or RGB signal and directly applied to a display device. Television signals may also be broadcast in the form of digital data. Examples of digital televisions standards include digital video broadcasting (DVB) or digital audio broadcasting (DAB).

Mobile television receivers may be used in any mobile device, including any vehicles, coaches and trains. In these vehicles, one or more display devices may be mounted at separate, distant locations from the television receiver. The transmission of video data from the television receiver, which is intended for display on a display device, is accomplished by employing a particular communication link connecting the television receiver and the display device.

Today's vehicles are increasingly being equipped with a communication network for transmitting entertainment and information data within the vehicle. Such a communication network may also be used to transmit the video signal from a television receiver for display on a display device. Examples of communication networks include the IEEE 1394 standard and the MOST standard. MOST communication networks are particularly intended for use in vehicles.

For transmission of the video data on such a communication network to one or more display devices, the video information to be transmitted may be adapted to the transmission scheme employed on the communication network. For this purpose, the video information may be transmitted in accordance with one of the standardized digital video encoding techniques. Such digital coding standards include, for example, the MPEG-x standards (MPEG-1, MPEG-2, MPEG-4 and MPEG-7) and the H.26x standards (H.261, H.262, H.263 and H.264).

In particular, MPEG-2 standards define the format of various component parts of a multi-media program. Such programs may consist of MPEG-2 encoded video, audio, control data, and so forth. MPEG-2 further defines the multiplexing of the components into a single synchronous transmission bit stream. The most basic component of an MPEG bit stream is the "elementary stream." Each elementary stream output by MPEG audio, video or data encoders contains a single type of signals. Each elementary stream is accumulated into a stream of "Packetised Elementary Stream" (PES) packets. A PES packet may be a fixed or variable sized block. The PES includes synchronization information such as the "elementary stream clock reference" (ESCR).

To generate an MPEG transport stream (TS), each PES packet may be broken into fixed-size transport packets forming a general purpose way of combining one or more streams. The transport stream may comprise a sequence of packets of 188 bytes. Each packet may include 184 bytes of payload and a 4 byte header.

The 4 byte header includes a packet identifier (PID), which may uniquely identify the stream to which the packet belongs and allow a receiver to respectively differentiate the TS packets. Each packet is associated with a PES through the setting of a PID value in the packet header. Some PID values are predefined and are used to indicate various streams of control information. A packet with an unknown PID may be silently disregarded by a receiver. A particular PID value of 0x1FFF is reserved to indicate that the packet is a null packet and to be ignored by the receiver. Such null packets are inserted to retain the specified TS bit rate.

Audio and video data may be transmitted to a reproduction device over a communication network in form of a MPEG TS. The MPEG TS includes audio packets and video packets differentiated by different PID values. Typically, there are more video than audio packets to be transmitted.

A reproduction device may include a display for displaying the video signal and have loudspeakers associated thereto for reproducing the audio signal. For transmission to the reproduction devices, the television signal may be encoded in accordance with one of the digital encoding standards, such as MPEG TS form, and transmitted towards the reproduction devices (also called "head units"). Each reproduction device may be provided with a decoding unit, which decodes the received encoded audio and/or video signals into analogue signals for reproduction on the display screen or the loudspeakers.

During travel of the vehicle, the signal strength of the received television signal varies and tends to undergo fading. Such variations in signal strength may cause distortions in the reproduced image on the display device and also in the audio signal. For effectively suppressing a disturbance in the recovered images and audio data, the television receiver has to continuously search for and switch to a television signal having a better signal strength.

The occurrence of fading and a switching between different radio stations continuously interrupts the received television signal and causes distortions in the reproduced audio and video signal. Depending on the length of each of the distortions, the digital encoding procedure and the transmission of data to the reproduction device is interrupted. Such interruptions cause the encoder to stop the encoding operation. As a result, the sequence of encoded video frames and audio data received at the reproduction device is abruptly stopped. A time consuming initialization procedure is required in the decoder of the reproduction device when the signal distortion is terminated and the transmission of encoded video and/or data is resumed. Thus, the quality of the reproduced television signal is more greatly affected, since the actual period of the distortion is extended due to a required resynchronization procedure at the display device.

The length of the interruption of the video signal display on the display device is prolonged by all steps needed to restart the decoding and reproduction procedure. For instance, each decoding unit is provided with a buffer to prevent a data underflow or overflow of the received audio and/or video data. The video buffer is operated such that the video data level is maintained around a predefined buffer level value. Consequently, a decoding and reproduction of new video information at the reproduction device cannot be started until the buffer has been filled again up to the predefined buffer level. Hence, the disturbance period on the display is affected accordingly.

Typically, to reduce the impact of signal distortions on the perceived image quality, error concealment occurs at the display side, i.e., within the reproduction device. The time period, when the reproduction device does not receive any new encoded video information, is bridged by applying predetermined video information to the display screen within the display device. This is accomplished by an additional memory provided in the display device storing video information in advance for reproduction on the display screen. Such video information may be, for instance, a screen of a uniform color or a uniform background having a text, such as "no signal," inserted therein.

Another typical approach for masking the video signal interruption at the display device is a freezing of the last completely received and encoded video frame and repetitively reproducing same until new video data is received at the display device.

Therefore, a need exists for a television receiver and methods for reproducing a television signal that provide an improved quality of the reproduced signal.

SUMMARY

Systems and methods for reproducing a television signal on a reproducing device are provided. The television signal may include audio and/or video data and may be transmitted television in encoded form over a communication link to the display device. The encoded signal may be decoded, and reproduced by a display device. Distortions in the reproduced television signal may be reduced by inserting information, such as data, before reproduction of the television signal. Distortion of the signal, such as the received signal, may be monitored. Upon detecting a distortion of the received television signal, stored audio and/or video data may be inserted from a memory into the encoded audio and/or video data to be transmitted.

The hardware and/or software for handling distortions in a received television signal may be shifted from the reproduction device to the television receiver in a distributed system, which comprises a receiver and a reproduction unit at a location distant from each other. Typically, the operations for transmitting the video information to the reproduction device, namely the encoding, transmission and decoding processing, abruptly break down if a distortion occurs in the received television signal. Instead, a continuous stream of encoded data that is transmitted to the reproduction device may be maintained. Advantageously, the effect of such signal distortions to the viewer may be minimized. In particular, neither a re-synchronization of the communication link nor a re-initialization of the decoding unit at the display is required when the transmission of new audio and/or video information to the display is resumed. The impact of distortions in the received television signal on the perceived image/audio quality thus may be reduced.

As this enables error concealment by employing a single hardware for a plurality of displays, the hardware effort and the processing capacity conventionally provided at display devices may be reduced. Thus, an improved image/audio quality may be achieved by employing less expensive reproduction devices, and in particular, head units.

The system may be employed, for example, in mobile television receivers. During travel, the received television signal may be subjected to fading and frequent switching between different broadcast channels. By employing the system in vehicles, coaches and trains, high image quality is achievable notwithstanding a continuous occurrence of poor receiving conditions.

Although the system may be used for receiving a terrestrially broadcast television signal, it may also be employed for receiving television signals broadcast via satellite or received from a data storage device such as a DVD player. Television signal transmission paths may be error prone and the effect of errors to the perceived image and audio quality may be reduced by employing the invention.

The video frames of the received television signals may be encoded in accordance with one of the well-known international video coding standards, such as the family of MPEG coding standards. Video signals encoded by employing one of these digital coding standards can be transmitted in a simple manner together with digitally encoded audio signals over a communication link. The use of such standards ensures interoperability with existing reproduction devices, and in particular, those not being equipped with any error concealment technology. Even existing vehicles may benefit from the image and audio quality improvement when a vehicle, coach or train is equipped with a television receiver in accordance with this application.

The received television signal may be in accordance with any analogue television standards, including, for example, PAL, SECAM and NTSC. Further, the system may be employed with digital transmission standards, for instance, the DVB (Digital Video Broadcasting) digital television standard.

In one approach, pre-stored audio and/or video data may be inserted as soon as a continuous transmission of encoded data to the reproduction device cannot be guaranteed, i.e., the continuous encoding procedure is interrupted. For video distortions, a pre-stored encoded frame may be inserted into the stream of data transmitted to the reproduction device. In the event the television signal distortion continues for a longer period of time, the stored video frame may be repetitively inserted in order to maintain a continuous transmission process of encoded video frames to the display device. As soon as a television signal of sufficient signal strength is received, the repetitive insertion may be stopped and a normal encoding and transmission procedure may be resumed. In order to cope with longer television signal distortions, a sequence of video frames may be stored in advance in the television receiver's memory.

The video data and audio data may be transmitted in a common data stream, e.g., a MPEG TS. Accordingly, audio and video data may be provided to the reproduction device in a simple manner. Further, the data obtained from the memory and transmitted to the reproduction device may be selected based on the type of distortion detected. For example, only the stored audio data may be inserted into the data stream to the reproduction device if a distortion in the received audio signal is detected. In a corresponding manner, the stored video data may only be inserted into the data stream to the reproduction device if only a distortion in the video data is detected. In this manner, the error concealment in the television receiver may be appropriately adapted to the kind of distortion present.

The video data may be stored in any suitable form, such as MPEG TS packet form. Accordingly, the computation effort required upon detection of a distortion may be minimized, as only the synchronization information needs to be adapted when inserting the packets to the transmission stream.

The audio data also may be stored in any suitable form, such as MPEG TS encoded form and inserted into the TS upon detection of a distortion. Alternatively, the audio data may be encoded in real-time into the MPEG TS format upon detection of a distortion. In this manner, the length of the audio data to be inserted may be set independent from the length of the inserted video data.

Further, the insertion of video data into the sequence of transmitted data to the reproduction device may be set depending on the length of the distortion. For example, short distortions may initiate the insertion of dummy data, distortions of an intermediate duration may initiate the insertion of a stored video frame, and longer lasting distortions may result in the insertion of a sequence of video or audio frames. In this manner, the error concealment process may be adaptively set depending on the severity of the distortion.

Moreover, the insertion of audio data may be set adaptively based on the length of the detected distortion. For example, a short disruption may cause an insertion of dummy data, while a longer distortion may cause the insertion of a pre-stored new sequence or a repetitive insertion thereof.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
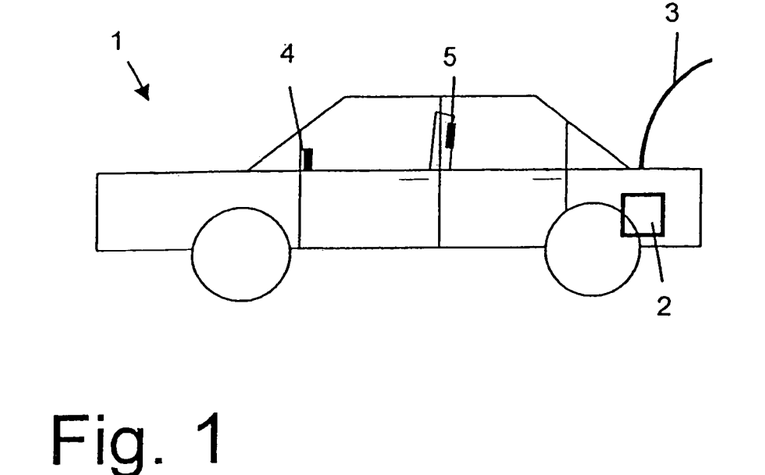
FIG. 1 illustrates a schematic configuration of examples of installation points for vehicle entertainment equipment.

The invention is intended for use in mobile vehicles. As shown in FIG. 1, the different components of a mobile entertainment system, particularly of a mobile television system, may be distributed over distant locations within the vehicle. While the processing hardware may be mounted at the rear side of the vehicle, in proximity to an antenna 3, display devices 4 and 5 for the reproduction of video data may be mounted on the vehicle's dashboard, and/or behind the front seats for rear-seat passengers. The video signals to be displayed may be transmitted from the television receiver to the plurality of display devices 4 and 5 at locations distant therefrom. This situation particularly arises in coaches and trains where a single processing hardware provides a video signal to a plurality of display devices at the individual passenger seats. The video signal transmission, together with associated audio, is accomplished by employing a communication link coupling the display devices 4 and 5 to the processing unit.

The display devices or reproduction devices may serve as "head units" and provide the additionally transmitted audio data to loudspeakers, which are arranged in proximity to the display screen. Alternatively, the loudspeakers may be arranged distant from the display screen.

Figure 2:
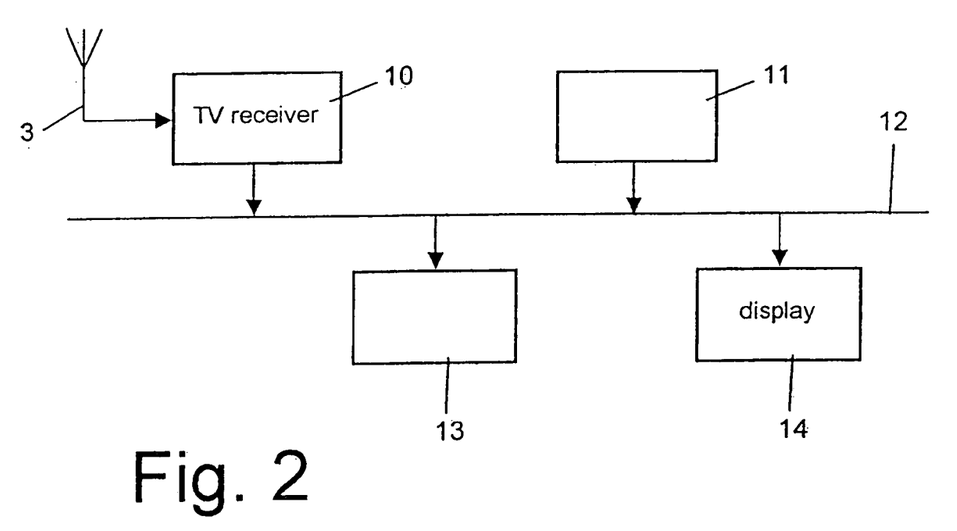
FIG. 2 illustrates schematically in block diagram form an example of the hardware configuration of vehicle entertainment equipment.

A general configuration of a car entertainment and information system is shown in FIG. 2. All or some components 10, 11, 13 and 14 of the car entertainment and information system may be coupled to communication link 12. In particular, a television receiver 10 may transmit video data and audio data over communication link 12 to reproduction device 14, which includes a display for reproduction of the video data thereon. The audio data may be reproduced by loudspeakers associated thereto.

Communication link 12 may be a vehicle communication network for connecting a plurality of entertainment and information units 10, 11, 13 and 14 provided in a vehicle. Vehicle communication networks are typically available in vehicles. One example of a vehicle communication network is the MOST bus. The television receivers 10, reproduction device 14 and other information and entertainment units 11 and 13 may be connected to MOST bus 12.

The video data may be transmitted from television receiver 10 towards reproduction device 14 in encoded form. The video data may be encoded in accordance with one of the internationally standardized video coding standards. Such video coding standards have been standardised by two international organizations, namely the International Telecommunication Union (ITU-T) and the International Standardization Organization/International Electro-technical Convention (ISO/ICE). The ITU-T Coding Standards are called recommendations and are denoted with H.26x, while the ISO/IEC Standards are denoted with MPEG-x. The MPEG-x and H.26x video coding families comprise the well-known video coding standards H.261, H.262, H.263, H.264, MPEG-1, MPEG-2, MPEG-4 and MPEG.7. These video coding standards have been developed for real time video communication applications and address the needs of video storage, broadcast and video streaming applications. The transmission of video data from television receiver 10 to reproduction device 14 is not limited to the above-mentioned video coding standards; rather, any other video coding may be used to achieve the same purpose.

The audio data also may be transmitted from television receiver 10 towards reproduction device 14 in encoded form. For this purpose, the audio data may be multiplexed into the transmitted data stream in accordance with the MPEG-2 standard. At the reproduction device side, the audio and video data may be de-multiplexed and separated for individual reproduction on the respective reproduction means, e.g., a display screen and loudspeakers.

Figure 3:
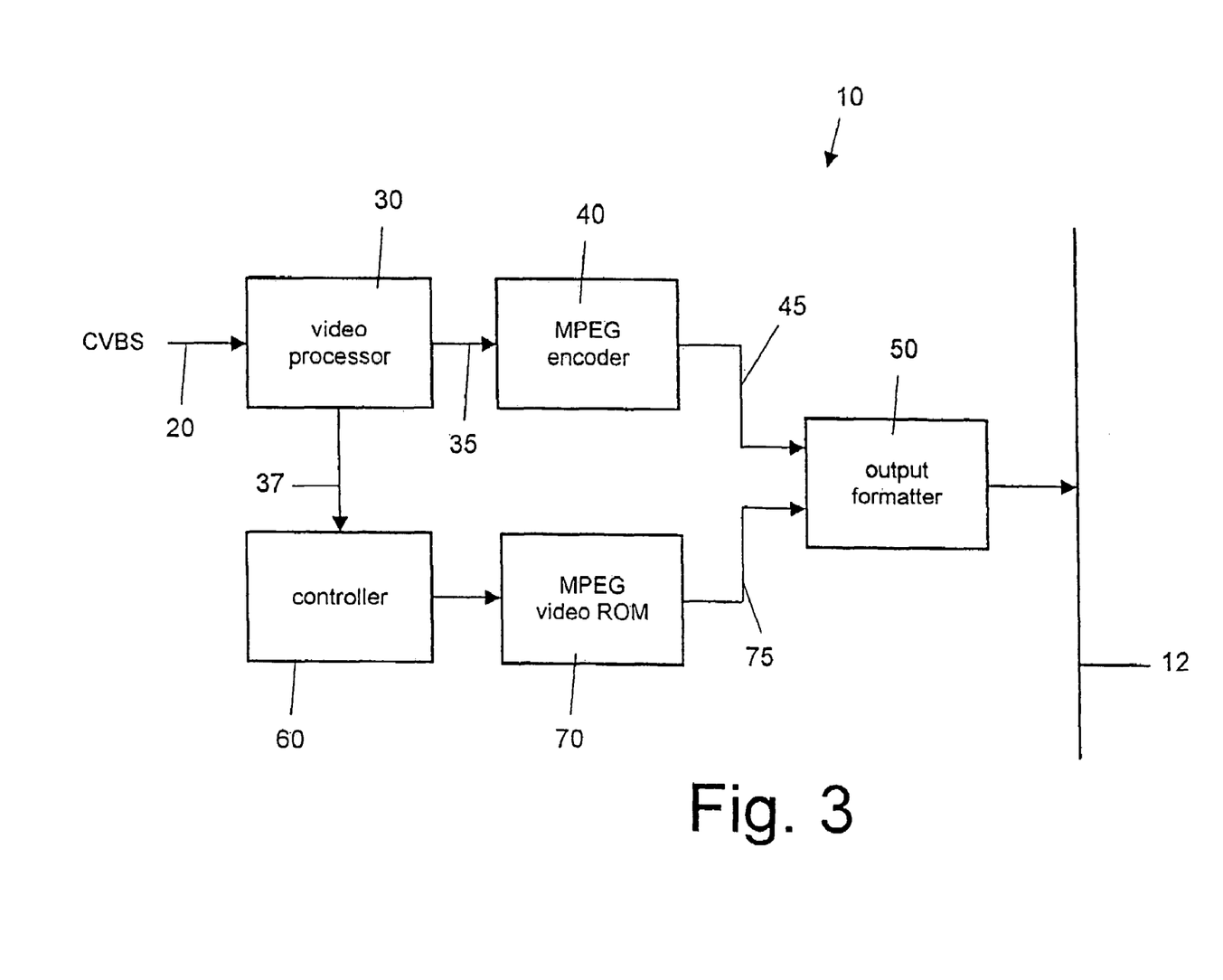
FIG. 3 illustrates schematically a configuration of a television receiver in accordance with the invention.

An example of a configuration of a television receiver 10 in accordance with this application is illustrated in FIG. 3. A television signal that has been broadcast by a radio station in any of the transmission standards PAL, SECAM, NTSC is received by the vehicle's antenna 3 and demodulated into a composite video signal (CVBS) 20. The composite video signal 20 is applied to a video processor 30, which supplies the sequence of video frames 35 of the television signal to an encoding unit 40. The terms "frame" and "video frame" in the context of the present description is not limited only to a progressive video data format, but may also include "fields" of an interlaced video data format.

The encoding unit 40 may subject the sequence of video frames 35 to image encoding and outputs a stream of compressed video data 45. An output formatter 50 may insert the stream of encoded video data 45 to communication link 12. Specifically, output formatter 50 may receive encoded video data 45 in parallel form and output the same after parallel-serial conversion to communication link 12.

The above description has focused primarily on analog transmission; however, the signals received by the television receiver may be provided in digital form. For example, digital television may be transmitted in digital form by standards such as the Digital Video Broadcast (DVB) or the Digital Audio Broadcast standard (DAB).

Video processor 30 may additionally monitor the received television signal (preferably the composite video signal 20 demodulated therefrom) for detecting the occurrence of signal distortions. Distortion may be monitored by investigating sync pulses and/or blanking intervals for the presence of noise or deviating amplitude and/or timing conditions.

If a signal distortion is detected that may adversely affect a continuous and synchronized transmission of encoded video data 45 from encoding unit 40, video processor 30 may initiate an insertion of pre-stored compressed video data 75 into the still existing stream of encoded video data 45. The inserted video data 75 may replace the video information missing due to the occurrence of a signal distortion.

The insertion procedure is commenced upon issuance of an insertion command 37 from video processor 30 to memory controller 60. Controller 60 may cause the pre-stored video data to be read out and inserted into the stream of video data transmitted to display device 14.

The video data inserted in the case of a television signal distortion is stored in advance in memory 70 of television receiver 10. Memory 70 may comprise a non-volatile memory for storing predefined video data in compressed form. Memory 70 may be implemented either in the form of a ROM memory or in the form of a RAM memory. While the use of a ROM memory only allows the storage of predefined video data once, the use of re-writable memory enables an exchange of the stored video information to be inserted into the transmitted video data and displayed in the event of signal distortions.

A flash type memory may be used to implement memory 70. A flash memory may be a constantly powered non-volatile memory that can be erased and reprogrammed in memory units of blocks. A flash memory is a variation of an electrically erasable programmable read-only-memory (EE-PROM). As flash memories can be re-written in block sizes, it facilitates an update of the pre-stored video and audio information.

The video information stored previously in memory 70 may represent different kinds of "distortion" screens. For instance, a blank screen of uniform color or a screen having additional text overlaid thereon, such as "no signal," may be shown in the event of a television signal interruption. The frame (or sequence of frames) stored in memory 70 can be permanently written into the memory during manufacturing of the television receiver. Alternatively, the pre-stored video data of memory 70 may be written into the memory after manufacture. For example, data may be loaded at predetermined points of time, such as during the start of the vehicle engine or when the television receiver is turned on. The pre-stored video data in memory 70 also may be replaced during maintenance of the vehicle by authorized service personnel or by the driver.

The video data provided in memory 70 for insertion in case of failure to receive a television signal of sufficient signal strength may be stored in compressed form. The selected compression format may correspond to that employed by encoding unit 40. If a television signal distortion is detected, controller 60 may cause the pre-stored video information to be read out from memory 70 and be inserted to communication link 12 via output formatter 50.

Figure 4:
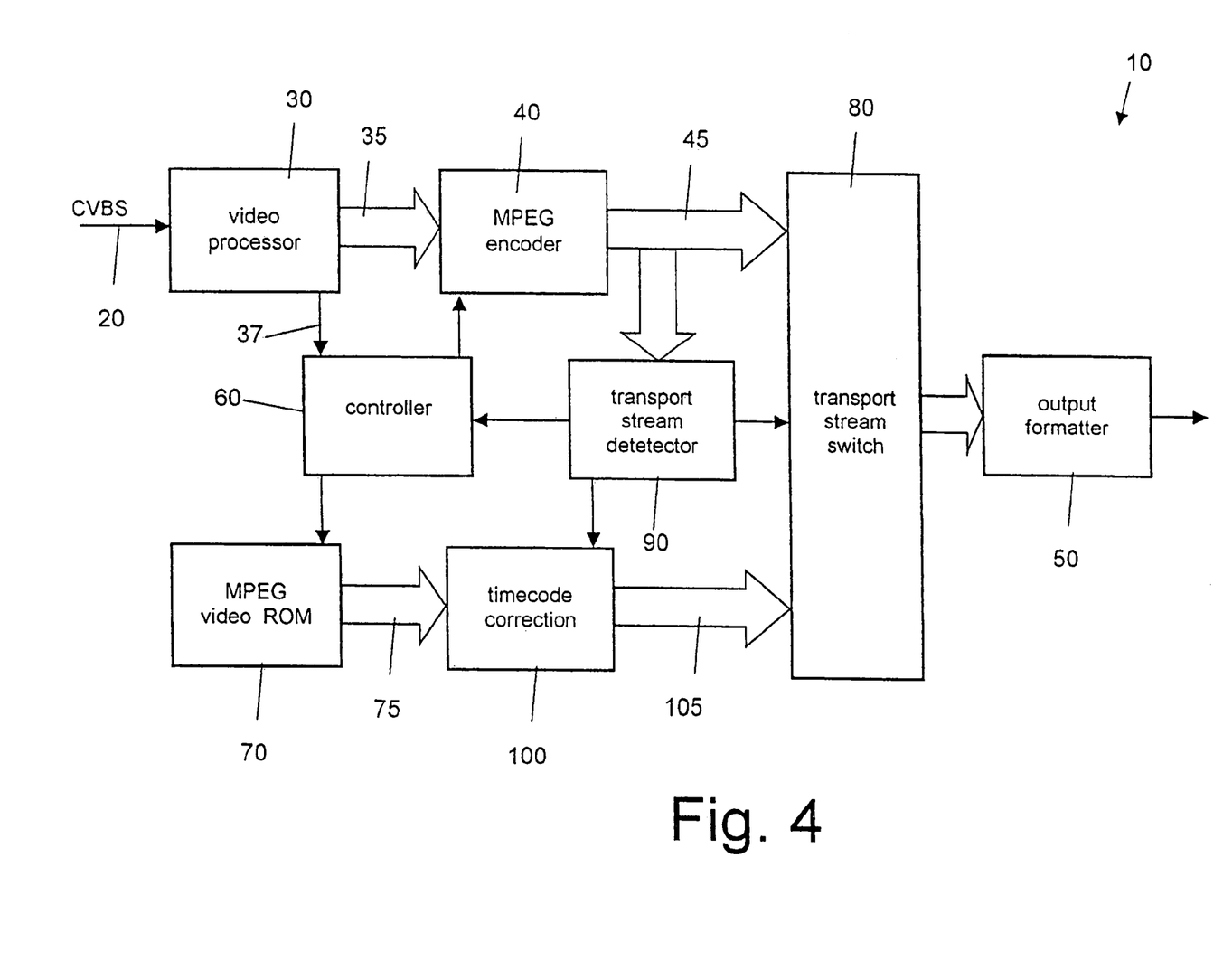
FIG. 4 illustrates another schematic configuration of a television receiver in accordance with the invention.

A more detailed configuration of the television receiver 10 in accordance with this application is illustrated in FIG. 4. The same reference numerals therein indicate corresponding functional blocks. In particular, FIG. 4 illustrates additional details for inserting the compressed video data from memory 70 to communication link 12.

An appropriate synchronization of the insertion of video data 75 from memory 70 into the transmitted sequence of encoded video data 45 is accomplished by a means of a transport stream switch 80, a transport stream detector 90 and a time correction unit 100. Transport stream detector 90 delivers information on the current status of transport stream 45, which is provided to the control unit 60, transport stream 80 and time correction unit 100.

Controller 60 initiates the insertion of the pre-stored video data 75 upon receiving a distortion detection signal 37 from video processor 30. In accordance therewith, the encoding procedure of encoder 40 is stopped and a read out of the pre-stored video data 75 is initiated. The read out video data 75 may be subjected to a time code correction in order to synchronize the new video data 75 to the previously encoded and transmitted video data 45 in temporal respect. After completion of the time correction operation, the synchronized video information 105 is applied to the transport stream switch 80. Transport stream switch 80 may switch between the currently encoded video signal 45 and the pre-stored encoded video data 105 for insertion on communication link 12.

Figure 5:
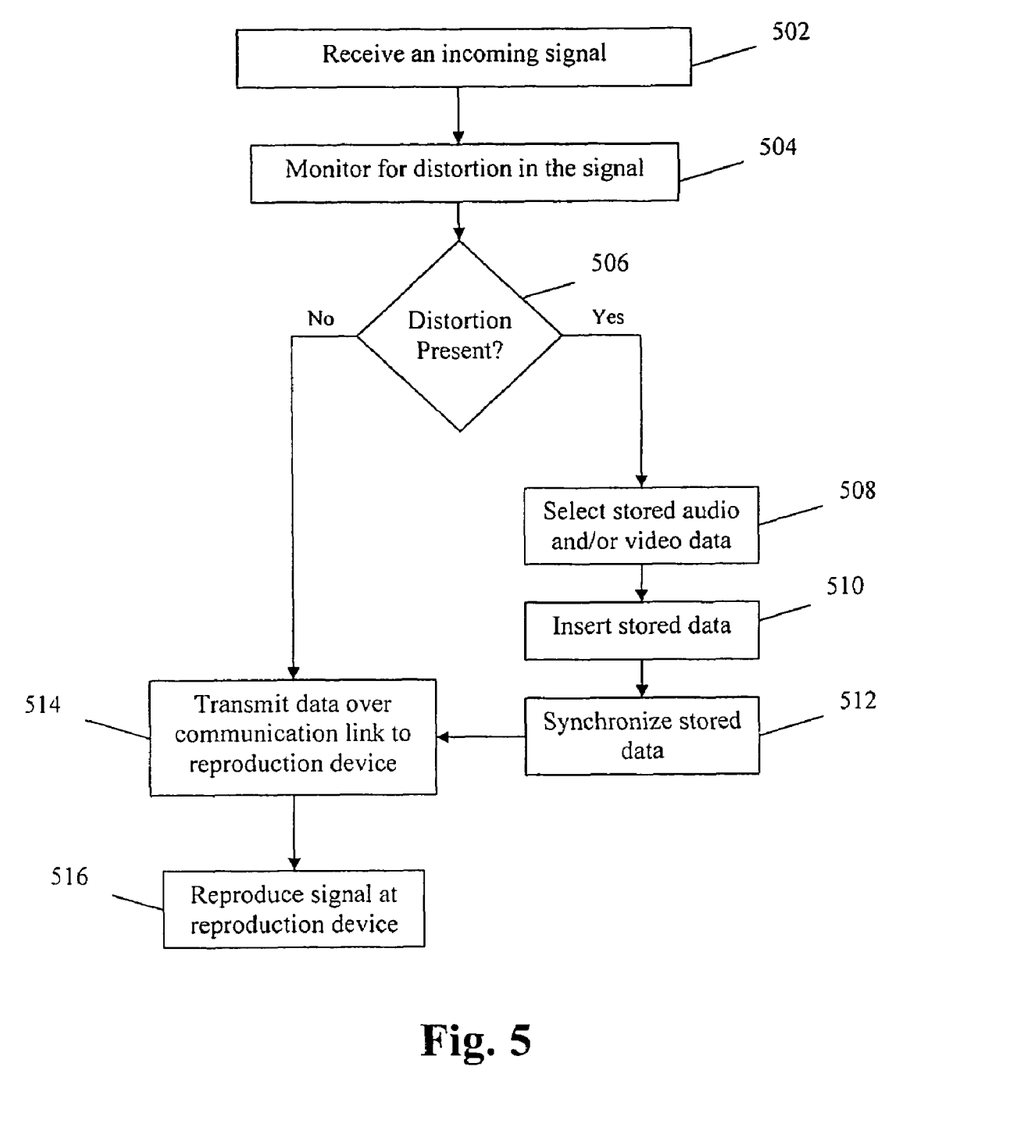
FIG. 5 is a flowchart describing one method of operation of a television receiver in accordance with the invention.

FIG. 5 depicts an example of a flowchart for operation of the television receiver. In block 502, television receiver 10 receives a signal that comprises a plurality of audio and/or video data. In block 504, television receiver 10 monitors the signal to determine if the signal has been distorted. As shown at block 506, it is determined whether a distortion is present.

If television receiver 10 determines that a distortion is not present, then the receiver may transmit data over communication link 12 to one or more reproduction devices 14, as indicated at block 514. The non-distorted signal then may be reproduced at the reproduction device, as shown at block 516.

However, if television receiver 10 detects a distortion in the received signal at block 506, then one or more steps may be taken to reduce the impact of the distortion. Specifically, blocks 508, 510, and 512 are performed, as described more fully below. Blocks 508 and 510 correspond to FIGS. 6 and 7, respectively.

Figure 6:
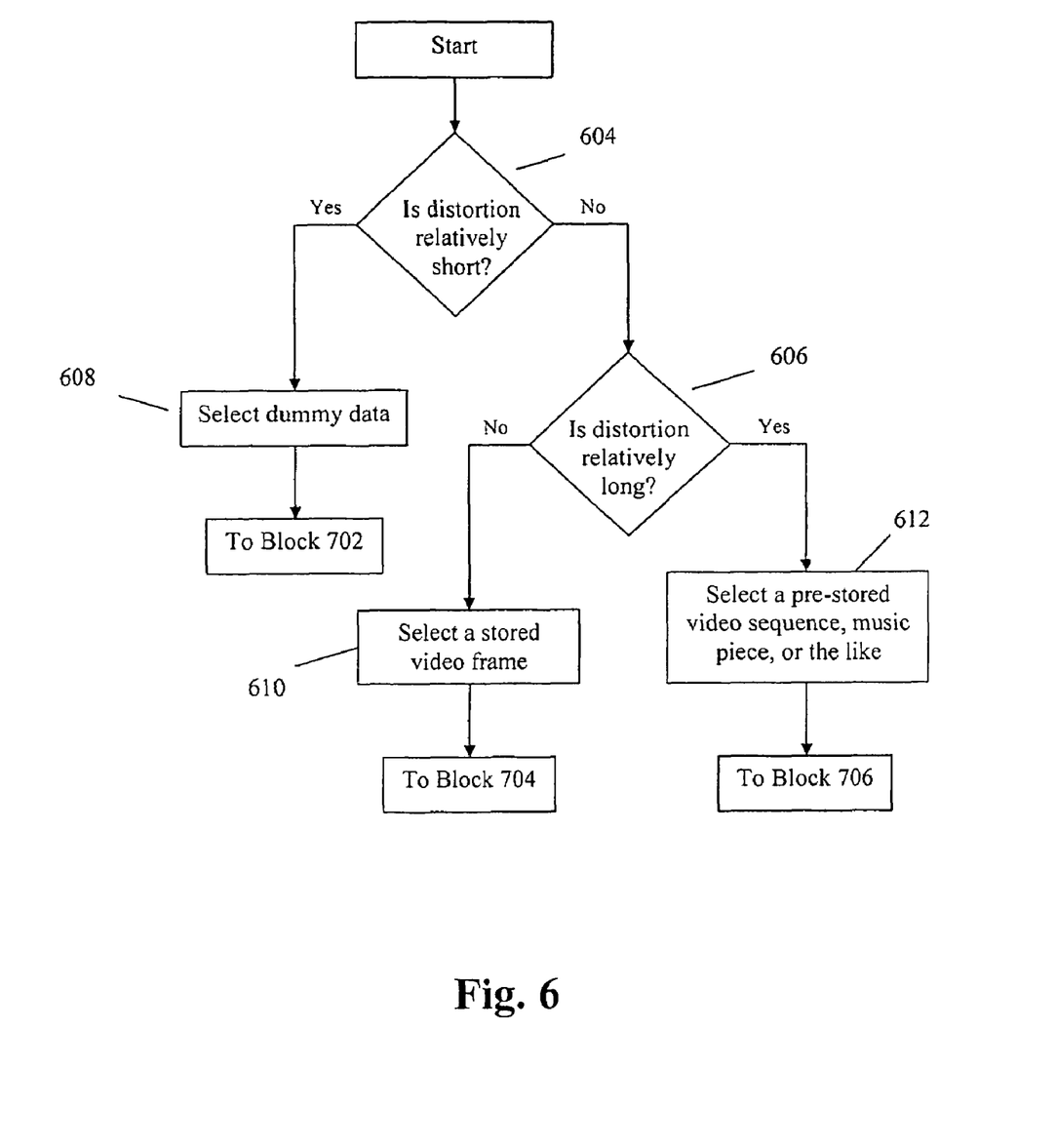
FIG. 6 is a flowchart that elaborates on various method steps described in FIG. 5.
Figure 7:
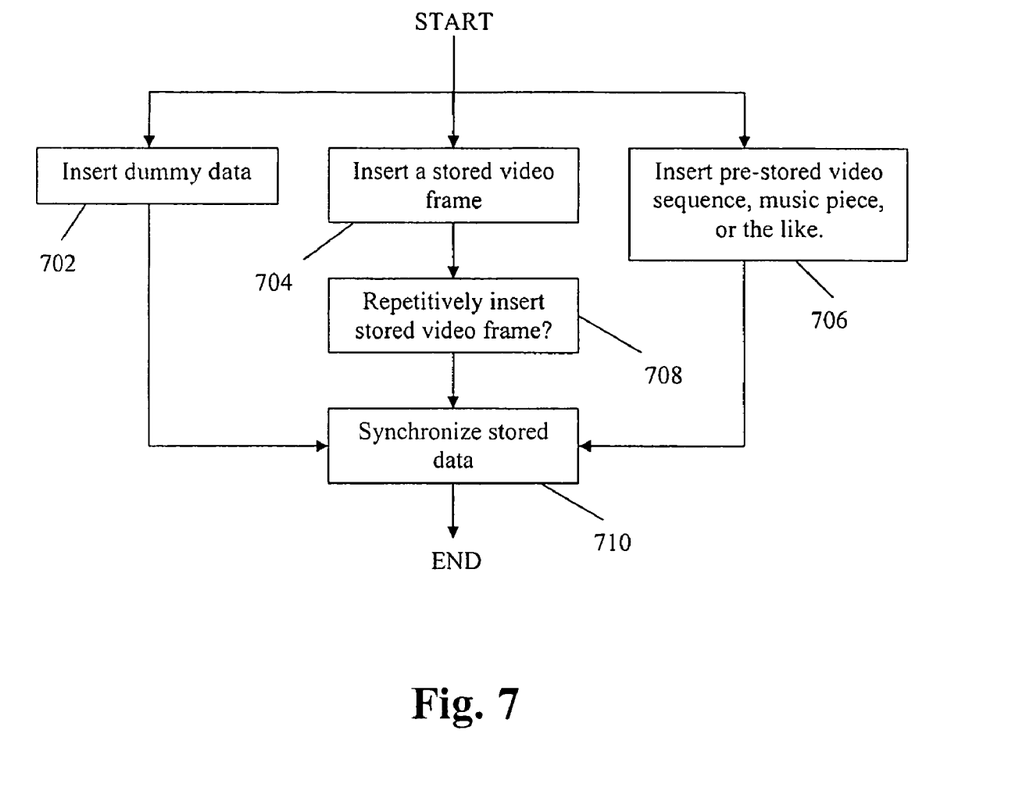
FIG. 7 is another flowchart that elaborates on various method steps described in FIG. 5.

When a distortion is detected in the incoming signal, television receiver 10 may select stored audio and/or video data for insertion into the encoded data to be transmitted to reproduction device 14. In selecting the stored data to be inserted, the approximate duration of the distortion may be considered. At block 604, it is determined whether the distortion is relatively short. If the distortion is relatively short, then at block 608 dummy data may be selected from data stored in memory 70. Dummy data may comprise a short period of meaningless signal, e.g., a black signal or other signal that does not decode into anything meaningful. The television receiver 10 then may insert the selected dummy data into the stream of data to be transmitted to the reproduction device, as shown at block 702.

If a relatively short distortion is not detected at block 604, then at block 606 it is determined whether the distortion is relatively long. If a relatively long distortion is detected, such as distortions of fractions of a second or one or more seconds, then at block 612 a pre-stored video sequence, music piece, or the like may be selected from data stored in memory 70. The television receiver 10 then may insert the selected sequence or piece into the stream of data to be transmitted to the reproduction device, as shown at block 706.

If an intermediate distortion is detected, e.g., a distortion lasting a few frame periods or milliseconds, or if simply an unknown distortion length occurs, then at block 610 the television receiver 10 may select a stored video frame from memory 70. The television receiver then may insert the stored video frame into the stream of data to be transmitted to reproduction device 14, as shown at block 704. If the distortion continues, then the video frame may be repetitively inserted, as indicated at block 708.

Regardless of whether television receiver 10 decides to insert dummy data, a stored video frame, or a musical or audio piece, such stored data may be synchronized with the incoming data stream received by television receiver 10. The synchronization step is shown at block 512 in FIG. 5 and at block 710 in FIG. 7. The synchronized data stream then is transmitted over communication link 12 and reproduced at reproduction device 14, as indicated by blocks 514 and 516, respectively.

The video data may be stored in the form of TS packets. Upon inserting the stored data into the transport stream, the packets are re-stamped in order to adapt the synchronization information to the transport stream to retain the specified TS bit rate.

The insertion may be initiated upon detection of a distortion in a television signal. This may be performed based on the signal strength, the demodulator result or the MPEG decoding result, if the television signal is transmitted in MPEG encoded form.

The length of the detected distortion may be employed in order to control the type of error concealment. If a distortion of a short length is detected, preferably only MPEG TS null packets are inserted into the transport stream. A short duration comprises only few TS packets. As soon as a distortion of longer length is detected, a mute frame may be inserted. Such frame data is obtained from the memory and may represent a blue screen or black screen. A distortion of such a length may only last for one or small number of frames. Upon detecting longer distortions, a pre-stored video sequence/music piece may be inserted.

Although various approaches have been described mainly in connection with the handling of video data and the concealment of distortions of the video signal portion of a television signal, the handling of audio signal distortions is performed in a corresponding manner. A detailed description is therefore omitted.

Further, although various approaches have been mainly described based on the reception of a television signal, the above-described methods may be employed with respect to reception of audio signals. For example, if an automobile receives a terrestrial or satellite radio signal, the receiver may comprise a detection unit that monitors for distortions, e.g., if reception is temporarily compromised.

In the latter example, if audio reception is distorted, then audio data may be inserted by the insertion unit. The inserted audio data may include one or more predetermined audio pieces stored in memory, for example, a silent noise or a predetermined musical piece. Therefore, a silent or relatively pleasant noise may be provided so that the user is not subjected to hearing substantial audio distortion.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A television receiver for receiving a television signal and for supplying audio and/or video data of said received television signal in form of an MPEG TS over a communication link to at least one reproduction device that is situated at a separate, distant location from the television receiver, the television receiver comprising:
   an encoding unit for encoding said audio and/or video data of said received television signal for transmission to said reproduction device as a stream of encoded audio and/or video data;
   a memory for storing predetermined audio and/or video data in MPEG TS encoded form for replacing audio and/or video data missing due to a distortion of said received television signal;
   a detection unit for detecting distortion in the received television signal; and
   an insertion unit for inserting the stored predetermined audio and/or video data into the stream of said encoded audio and/or video data of said received television signal upon detection of a signal distortion by the detection unit.

2. The television receiver of claim 1, where the television receiver is configured to supply the received data over a communication link to the reproduction device.

3. The television receiver of claim 1, where the television receiver is a mobile television receiver.

4. The television receiver of claim 1, where the television receiver is configured to receive television signals broadcast terrestrially or via satellite or being received from a data storage device.

5. The television receiver of claim 1, where at least some of the predetermined audio and/or video data comprises video data stored in the memory in compressed form.

6. The television receiver of claim 5, where the predetermined video data is only transmitted to the reproduction device if a distortion has been detected in video data associated with the incoming signal.

7. The television receiver of claim 1, where at least some of the predetermined audio and/or video data comprises audio data stored in the memory in compressed form.

8. The television receiver of claim 7, where the predetermined audio data is only transmitted to the reproduction device if a distortion has been detected in audio data associated with the incoming signal.

9. The television receiver of claim 7, where the predetermined audio data represents silence or a piece of music.

10. The television receiver of claim 1, where the predetermined audio and/or video data comprises audio and video data being stored in the memory in compressed form, where the stored audio data and the stored video data represent a corresponding reproduction time period.

11. The television receiver of claims 10, where the reproduction time period of the stored audio data is longer than the reproduction time period of the stored video data.

12. The television receiver of claim 1, where the insertion unit adapts synchronization information of the predetermined audio and/or video data to that of current transmission stream data.

13. The television receiver of claim 1, where the insertion unit selects stored predetermined audio and/or video data depending on the length of a detected distortion.

14. The television receiver of claim 13, where the insertion unit selects predetermined audio and/or video data from a source comprising dummy data, a stored video frame, a stored video sequence, or a stored audio sequence.

15. The television receiver of claim 13, where the insertion unit repetitively inserts a stored video frame from the memory for display by the reproduction device, depending on the length of a distorted incoming signal as detected by the detection unit.

16. An entertainment system comprising:
a television receiver for receiving a television signal and for supplying audio and/or video data of said received television signal in form of an MPEG TS over a communication link to at least one reproduction device,
where the television receiver comprises a memory for storing predetermined audio and/or video data in MPEG TS encoded form for replacing audio and/or video data missing due to distortion of said received television signal, a detection unit for detecting a distortion in the received television signal, and an insertion unit for inserting the stored predetermined audio and/or video data into a stream of encoded audio and/or video data of said received television signal;
where the at least one reproduction device is situated at a separate, distant location from the television receiver; and
where the insertion unit is configured to insert the predetermined audio and/or video data into the stream of said encoded audio and/or video data upon detection of a signal distortion.

17. The entertainment system of claim 16, where the reproduction device comprises a display and a loudspeaker.

18. The entertainment system of claim 16, where the insertion unit selects predetermined audio and/or video data depending on the length of a detected distortion.

19. The entertainment system of claim 18, where the insertion unit selects predetermined audio and/or video data from a source comprising dummy data, a stored video frame, a stored video sequence, or a stored audio sequence.

20. The entertainment system of claim 16, where the insertion unit repetitively inserts a stored video frame from the memory for display by the reproduction device, depending on the length of a distorted television signal portion as detected by the detection unit.

21. A method for reproducing a signal on a reproduction device, the method comprising:
storing predetermined audio and/or video data in MPEG TS encoded form in a memory of a television receiver;
receiving data associated with a television signal at the television receiver;
transmitting data associated with the received television signal over a communication link from the television receiver to the reproduction device in form of an MPEG TS, where the reproduction device is situated at a separate, distant location from the television receiver;
monitoring the received television signal for signal distortions at the television receiver; and
upon detecting a distortion in the received television signal, inserting at least some of the stored predetermined audio and/or video data from the memory into an encoded audio and/or video data stream associated with the received television signal.

22. The method of claim 21, where the received television signal is broadcast and received by a mobile television receiver.

23. The method of claim 21, where the received television signal is broadcast terrestrially or via satellite or received from a data storage device.

24. The method of claim 21, where stored predetermined audio data is only transmitted to the reproduction device upon detecting a distortion in audio data included in the received television signal.

25. The method of claim 24, where the predetermined audio data represents silence or a piece of music.

26. The method of claim 24, where stored predetermined video data is only transmitted to the reproduction device upon detecting a distortion in video data included in the received television signal.

27. The method of claim 26, where the stored audio data and the stored video data represent a corresponding reproduction time period.

28. The method of claim 27, where the reproduction time period of the stored audio data is longer than the reproduction time period of the stored video data.

29. The method of claim 21, where inserting the stored predetermined audio and/or video data comprises selecting one of dummy data, a stored video frame, a stored video sequence, or a stored audio sequence.

30. The method of claim 29, where the stored predetermined audio and/or video data is selected based upon the length of a distorted in the incoming signal.

* * * * *

UNITED STATES PATENT AND TRADEMARK OFFICE
CERTIFICATE OF CORRECTION

PATENT NO.           : 7,646,435 B2                                    Page 1 of 1
APPLICATION NO.      : 11/272218
DATED                : January 12, 2010
INVENTOR(S)          : Teichner et al.

It is certified that error appears in the above-identified patent and that said Letters Patent is hereby corrected as shown below:

At column 1, line 54, "Examples of digital televisions..." should be changed to "Examples of digital television..."
At column 2, line 59, "...signals into analogue..." should be changed to "...signals into analog..."
At column 3, line 3, "...fading and a switching..." should be changed to "...fading and switching..."
At column 3, lines 34-35, the two "," should be deleted.
At column 6, lines 8-9, "...a mobile entertainment system..." should be changed to "...a mobile entertainment system 1..."
At column 6, line 11, "...the processing hardware..." should be changed to "...the processing hardware 2..."
At column 6, line 23, "...the processing unit..." should be changed to "...the processing unit 2..."
At column 6, line 24, "The display devices..." should be changed to "The display devices 4 and 5..."
At column 6, line 51, "...have been standardised..." should be changed to "...have been standardized..."
At column 7, line 5, "At the reproduction device..." should be changed to "At the reproduction device 14..."
At column 8, line 11, "...the television receiver..." should be changed to "... the television receiver 10..."
At column 8, line 56, "...the television receiver..." should be changed to "...the television receiver 10..."
In Claim 8, column 10, line 64, "...the incoming signal" should be changed to "the incoming television signal."
In Claim 8, column 11, line 4, "...the incoming signal" should be changed to "the incoming television signal."
In Claim 11, column 11, line 12, "The television receiver of claims 10..." should be changed to "The television receiver of claim 10..."
In Claim 30, column 12, line 56, "...a distorted. .." should be changed to "...a distortion..."

Signed and Sealed this
Twenty-sixth Day of June, 2012

David J. Kappos
*Director of the United States Patent and Trademark Office*